Patented Mar. 6, 1945

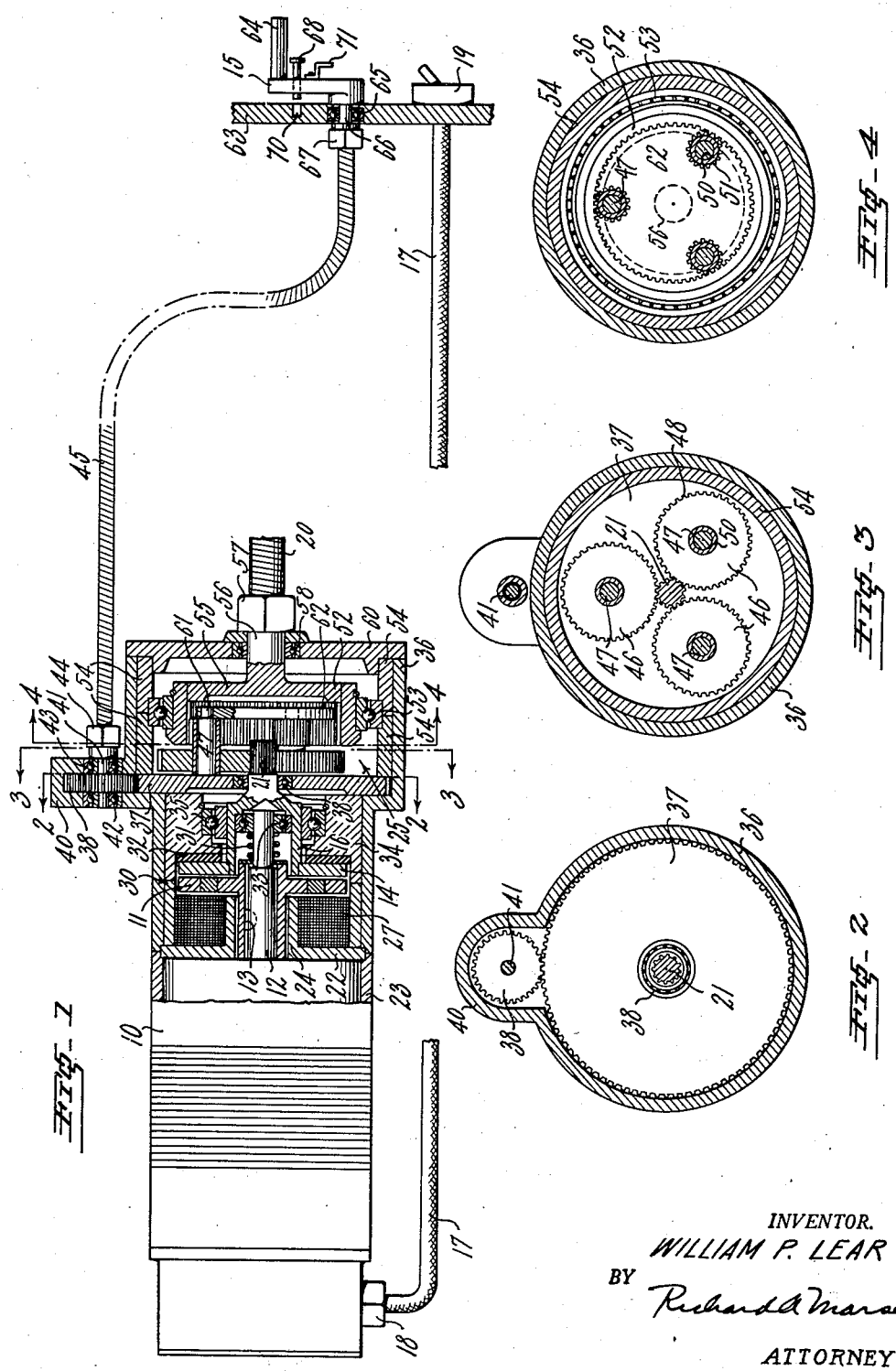
INVENTOR.
WILLIAM P. LEAR

2,370,976

UNITED STATES PATENT OFFICE 2,370,976

SELECTIVE DRIVING SYSTEM

William P. Lear, North Hollywood, Calif., assignor, by mesne assignments, to Lear, Incorporated, Piqua, Ohio, a corporation of Illinois Application August 17, 1943, Serial No. 499,009

2 Claims. (Cl. 74—282)

This invention relates to a multiple drive system and more particularly to such a system by which a member may be selectively driven by either power driving means or manually.

In motor actuated driving systems where great reliability is necessary, means are advantageously provided for actuating the driven system in the event of failure of the motor. This is particularly true of motor driven aircraft accessories, such as landing gears, wing flaps, and so forth.

It is among the objects of the present invention to provide a simple, reliable multiple drive system which is normally motor actuated, but may be readily conditioned for manual actuation; to provide a drive system including a pair of driving devices and a driven member interconnected by gearing, in which selectively operable means are provided to condition the gearing for actuation of the driven member by either of the driving devices; and to provide a multiple drive system including a motor connected through planetary gearing to a driven member and a remotely located manual driving mechanism also connected to the planetary gearing.

These and other objects, advantages and features of the invention will be apparent from the following description and accompanying drawing. In the drawing:

Fig. 1 is a schematic view, partly in section, illustrating an embodiment of the invention.

Fig. 2 is a cross-sectional view taken along the line 2—2 of Fig. 1.

Fig. 3 is a cross-sectional view taken along the line 3—3 of Fig. 1.

Fig. 4 is a cross-sectional view taken along the line 4—4 of Fig. 1.

Generally speaking, the embodiment of the invention illustrated in the drawing comprises a first power driving device, such as a motor 10, and a second or manual driving device 15, such as a crank. Both driving devices are interconnected to each other and to a driven member, such as flexible shafting load 20, through the medium of planetary gearing 25. Motor 10 and manual driving device 15 are each connected to different elements of the planetary gearing. Means are provided associated with device 15 to lock the same to condition the planetary gearing for actuation of load 20 by the motor 10. Motor 10 includes an electromagnetic clutch 30 which, when the motor is deenergized, is effective to condition the planetary gearing for actuation of shafting 20 by manual drive means 15.

Clutch 30 may be of the type described in my Patent No. 2,267,114, issued December 23, 1941, for "Electromagnetic clutch." It comprises a driving disk 11, secured on motor shaft 12 by a key 13, and a driven disk 14 including a hub member 16 which terminates in a driving pinion 21. An annular member 22 is supported in the motor housing 23 and has a hub portion 24 which supports the clutch energizing winding 27. Winding 27 is connected in either series or parallel circuit relation with motor 10. Upon energization of motor 10, a magnetic circuit is completed between the driving disk 11 and the driven disk 14 urging them into frictional and magnetic engagement. The energization of motor 10 and clutch 30 is controlled through the medium of a cable 17 extending from bushing 18 on the motor to a control switch 19 mounted adjacent manual drive means 15. When the clutch is deenergized, a spring 31 moves driven disk 14 away from driving disk 11 and into engagement with a braking surface 32. Driven disk 14 is supported on motor shaft 12 by bearing 33 and in a housing 34 by bearing 35.

Planetary gearing 25 is enclosed in a housing 36 secured to motor housing 23, and which also encloses clutch 30. Gearing 25 includes a mounting gear 37 rotatably mounted on bearing 38 on the hub member 16 of clutch driven element 14. As shown more particularly in Fig. 2, gear 37 meshes with a pinion 39 mounted in extension 40 of housing 36. Shaft 41 of pinion 39 is mounted in bearings 42, 43 and is connected through a well-known type of driving connection 44 to flexible shafting 45. Shafting 45 is operatively associated with manual driving device 15, as will be described.

Referring to Fig. 3, it will be observed that a plurality of planetary pinions 46, which in the present instance are three in number, are rotatably mounted on gear 37 through the medium of shafts 47. Pinions 46 are double pinions, having a large pinion gear 48 meshing with driving pinion 21 and secured on a sleeve 50. As shown in Fig. 4, a small pinion 51 is also secured on each sleeve 50 and pinions 51 mesh with an internal ring gear 52. Ring gear 52 is rotatably mounted in bearings 53 secured between spacing sleeve members 54, 54 in housing 36. Gear 52 includes a disk portion 55 terminating in a hub 56. Hub 56 is connected through driving connection 57 to flexible shafting 20, and it is mounted in bearing 58 in an end plate 60 of housing 36. To secure a rigid support, the ends of shafts 47 are each reduced as at 61, and these reduced ends are secured in a plate 62.

Manual driving device 15 is generally mounted remotely from the planetary gearing 25 such as on a support 63. It includes a crank handle 64 mounted in bearing 65 in support 63, and having a hub 66 connected through a driving connection 67 to flexible shafting 45. Crank 64 is provided with a pin 68 which coacts with any one of a number of apertures 70 in support 63 for locking the crank handle against movement. A latch 71 may be provided to hold the pin 68 in its locking position.

The operation of the system is as follows. Normally pin 68 is engaged in one of the apertures 70 and held therein by latch 71. This locks crank handle 64 and thus holds pinion 38 against movement. When motor 10 is energized by control on switch 19, clutch 20 is also energized so that its driving and driven elements are in magnetic and frictional engagement. Motor 10 thus drives driving pinion 21. As pinion 38 is fixed against movement, gear 37 is held stationary. Rotation of driving pinion 21 therefore rotates planetary pinions 46 to, in turn, drive ring gear 52. Ring gear 52 through connection 57 actuates flexible shafting 20. This drive control is in either direction of rotation or movement.

Should the circuit of motor 10 be opened either intentionally or accidentally, clutch 20 is deenergized and driven element 14 immediately engages braking surface 32. Under such conditions, driving pinion 21 is held stationary. For manual drive control crank handle 64 is unlatched by removing pin 68 from aperture 70, and shafting 20 is driven by operation of crank 64. Operation of crank 64 will rotate pinion 38 which in turn drives gear 37. Rotation of gear 37 will carry planetary pinions 46 around driving pinion 21 which is fixed against movement. This in turn will cause gear 37 to drive ring gear 52 and thus the flexible shafting 20. It will thus be apparent that each driving mechanism is operatively associated with a different element of the planetary gearing. When one driving mechanism is locked against movement, the planetary gearing is conditioned for actuation of shafting 20 by the other driving device.

The drive system is particularly advantageous as a safety drive for aircraft accessories. If shafting 20 is connected to drive accessories, such as landing gears or wing flaps, these elements will normally be operated by motor 10. However, the supplemental manual driving device 15 is always directly connected to gearing 25. Should motor 10 fail, manual device 15 is instantaneously effective to actuate the drive system and the associated aircraft accessories. However, the arrangement is such that crank 64 is normally held stationary even though it is connected directly to gearing 25. No time need be lost in engaging device 15 with the gearing, which is an important advantage in emergencies such as failure of the power supply to motor 10.

While a specific embodiment of the invention has been described to illustrate the application of the principles thereof, it will be understood that the invention may be otherwise embodied without departing from such principles.

I claim:

1. A power transmission arrangement including a driven member; planetary gearing including an internal ring gear connected to said driven member, a mounting gear and a plurality of planetary pinions rotatably mounted on said mounting gear and meshing with said ring gear; a first driving pinion engaging said planetary pinions; a power driving device; a clutch having a driving element connected to said power driving device and a driven element connected to said first driving pinion; means effecting engagement of said clutch elements in response to energization of said power driving device; a second driving pinion engaging said mounting gear; a manual driving device connected to said second driving pinion; selectively operable holding means operatively associated with said manual driving device for holding stationary its associated driving pinion to condition said planetary gearing for actuation of said driven member by said power driving device; a braking surface; and means effecting engagement of said clutch driven element and said braking surface in response to deenergization of said power driving device to condition said gearing for actuation of said driven member by said manual driving device.

2. A power transmission arrangement including a driven member; planetary gearing including an internal ring gear connected to said driven member, a mounting gear and a plurality of planetary pinions rotatably mounted on said mounting gear and meshing with said ring gear; a first driving pinion engaging said planetary pinions; an electric motor; an electromagnetic clutch having a driving element connected to said motor and a driven element connected to said first driving pinion, said clutch having a magnetizing winding in circuit relation with said motor and energized simultaneously therewith to effect engagement of said elements; a second driving pinion engaging said mounting gear; a manual driving device connected to said second driving pinion; selectively operable holding means operatively associated with said manual driving device for holding against rotation its associated driving pinion to condition said planetary gearing for actuation of said driven member by said motor; a braking surface; and means urging said clutch driven element into engagement with said braking surface in response to deenergization of said motor and clutch to condition said gearing for actuation of said driven member by said manual driving device.

WILLIAM P. LEAR.